US012125415B2

(12) United States Patent
Shetty

(10) Patent No.: US 12,125,415 B2
(45) Date of Patent: *Oct. 22, 2024

(54) DOOR CLOSER POWER ADJUSTMENT

(71) Applicant: Schlage Lock Company LLC, Carmel, IN (US)

(72) Inventor: Adithya Gangadhar Shetty, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,542

(22) Filed: Aug. 8, 2023

(65) Prior Publication Data

US 2024/0185748 A1 Jun. 6, 2024

Related U.S. Application Data

(63) Continuation of application No. 17/372,926, filed on Jul. 12, 2021, now Pat. No. 11,721,250.

(51) Int. Cl.
*G09F 23/00* (2006.01)
*E05F 1/10* (2006.01)

(52) U.S. Cl.
CPC .............. *G09F 23/00* (2013.01); *E05F 1/105* (2013.01); *E05Y 2201/474* (2013.01); *E05Y 2900/132* (2013.01)

(58) Field of Classification Search
CPC ........................... G09F 23/00; E05F 2900/132
See application file for complete search history.

(56) References Cited

U.S. PATENT DOCUMENTS

| | | | | | |
|---|---|---|---|---|---|
| 4,302,047 | A * | 11/1981 | Esser | B60N 2/2252 74/462 |
| 6,126,420 | A * | 10/2000 | Eisenmann | F04C 14/10 418/19 |
| 6,282,750 | B1 * | 9/2001 | Bishop | E05F 3/102 16/72 |
| 6,520,266 | B2 * | 2/2003 | Bongers-Ambrosius | B25D 11/12 173/2 |
| 9,062,488 | B2 * | 6/2015 | Sasaki | E05F 15/611 |
| 9,284,768 | B2 * | 3/2016 | Sasaki | E05F 15/63 |
| 10,704,310 | B1 * | 7/2020 | Barbon | E05F 1/105 |
| 10,815,712 | B2 * | 10/2020 | Toloday | E05F 3/12 |
| 10,865,852 | B2 * | 12/2020 | Ohr | F16H 1/32 |
| 10,982,479 | B2 * | 4/2021 | Eickhoff | E05F 1/1041 |

(Continued)

OTHER PUBLICATIONS

How to Design a Cycloidal Gear Step by Step; https://www.youtube.com/watch?v=guvatctnjww.

(Continued)

*Primary Examiner* — Christine M Mills
*Assistant Examiner* — Matthew J Sullivan
(74) *Attorney, Agent, or Firm* — Taft Stettinius & Hollister LLP

(57) ABSTRACT

An exemplary indicator mechanism is configured for use with a door closer including a body and an adjustment screw. The indicator mechanism generally includes an indicator, at least one indicium, and a cycloidal drive. The cycloidal drive is configured to selectively align the indicator and the at least one indicium in response to rotation of the adjustment screw to thereby indicate an operating characteristic of the door closer.

20 Claims, 6 Drawing Sheets

(56) References Cited

U.S. PATENT DOCUMENTS

| | | | | |
|---|---|---|---|---|
| 11,034,265 | B2 * | 6/2021 | Leportier | B60N 2/2252 |
| 2021/0207417 | A1 * | 7/2021 | Koo | E05F 1/1215 |
| 2021/0251343 | A1 * | 8/2021 | Martin | A43C 11/165 |

OTHER PUBLICATIONS

International Search Report; International Searching Authority; International Patent Application No. PCT/US2022/036806; Jan. 10, 2023; 2 pages.

Written Opinion; International Searching Authority; International Patent Application No. PCT/US2022/036806; Jan. 10, 2023; 3 pages.

* cited by examiner

DOOR CLOSER POWER ADJUSTMENT

CROSS REFERENCE TO RELATED APPLICATIONS

The present application is a continuation of U.S. patent application Ser. No. 17/372,926 filed Jul. 12, 2021 and issued as U.S. Pat. No. 11,721,250, the contents of which are incorporated by reference in their entirety.

TECHNICAL FIELD

The present disclosure generally relates to adjustable closers, and more particularly but not exclusively relates to adjustable door closers.

BACKGROUND

Door closers are typically installed to doors to provide a closing force that biases the door toward a closed position. The strength of the closing force corresponds to the "size" of the door closer, which is typically measured on a scale of one to six. Certain existing door closers include mechanisms by which the closing force can be adjusted to adjust the size of the door closer. While certain existing closers include visual indicators that indicate the strength of the closing force, many such indicators suffer from certain drawbacks, such as the number of parts required. For these reasons among others, there remains a need for further improvements in this technological field.

SUMMARY

An exemplary indicator mechanism is configured for use with a door closer including a body and an adjustment screw. The indicator mechanism generally includes an indicator, at least one indicium, and a cycloidal drive. The cycloidal drive is configured to selectively align the indicator and the at least one indicium in response to rotation of the adjustment screw to thereby indicate an operating characteristic of the door closer. Further forms, features, and embodiments of the present application will become apparent upon reviewing the description and figures provided herewith.

DETAILED DESCRIPTION OF ILLUSTRATIVE EMBODIMENTS

Figure 1:
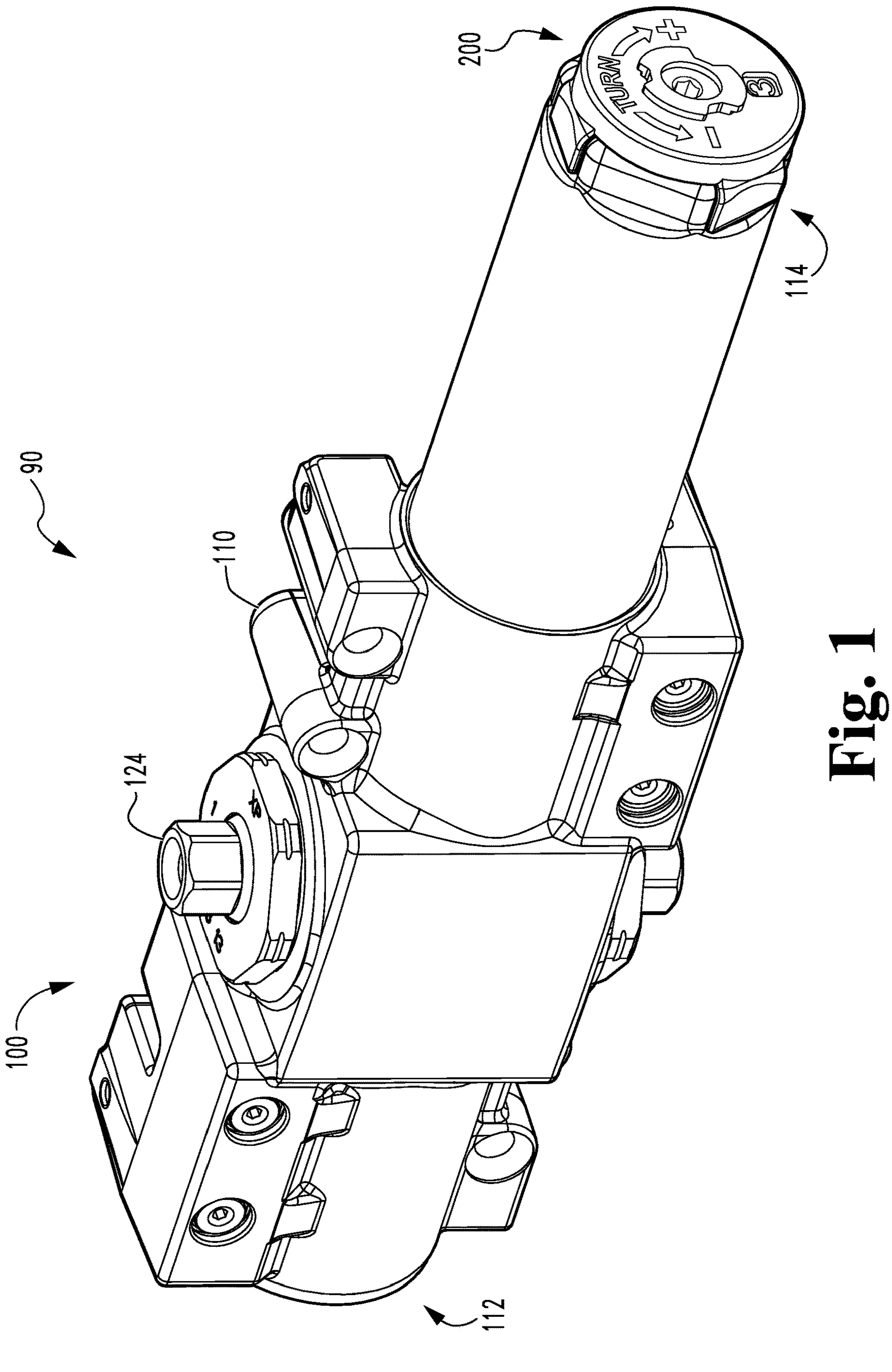
FIG. 1 is a perspective view of a door closer assembly including a door closer and an indicator mechanism according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 2:
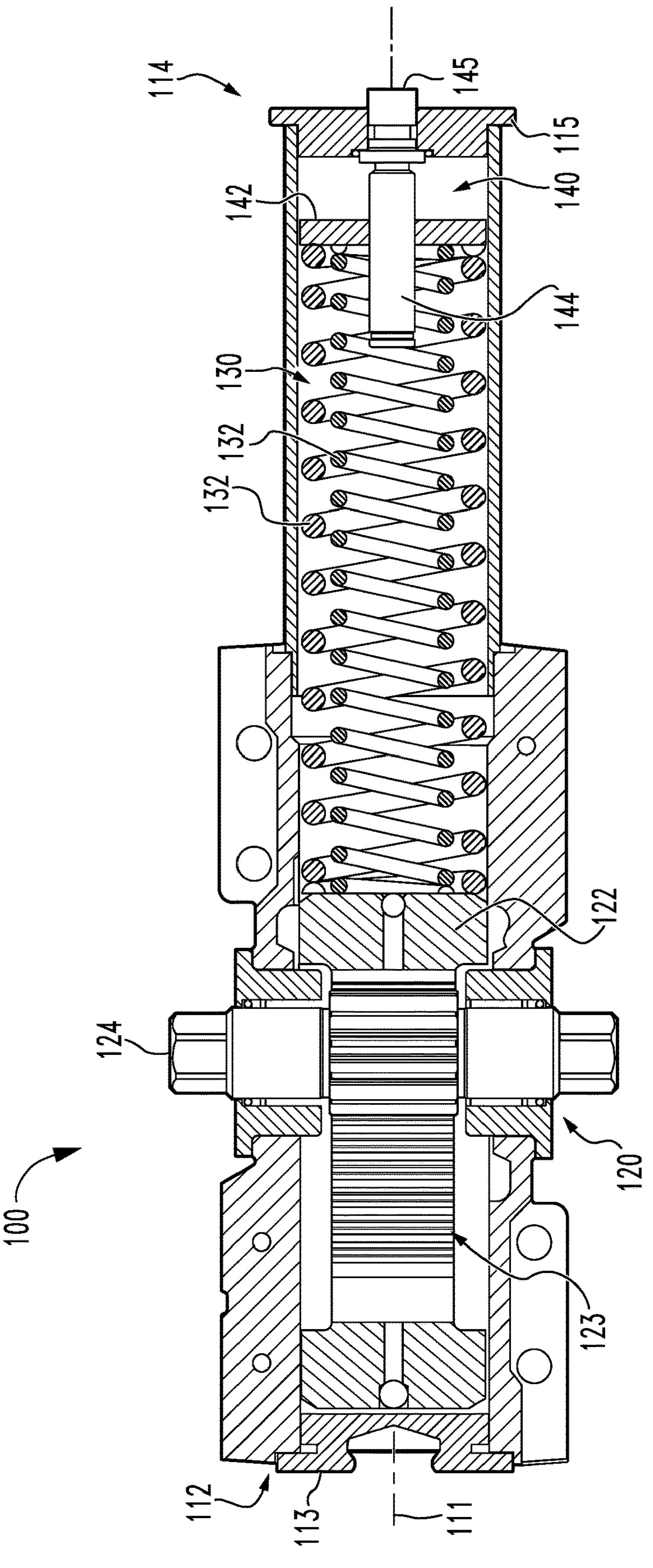
FIG. 2 is a cross-sectional illustration of the door closer.

With reference to FIGS. 1 and 2, illustrated therein is a door closer assembly 90 according to certain embodiments. The assembly 90 generally includes a door closer 100 and an indicator mechanism 200 according to certain embodiments. The door closer 100 includes a closer body 110, a rack and pinion assembly 120 mounted in the closer body 110, a spring assembly 130 engaged with the rack and pinion assembly 120, and a force adjustment mechanism 140 operable to adjust the biasing force provided by the spring assembly 130. As described herein, the "size" of the door closer 100 can be adjusted by manipulating the force adjustment mechanism 140, and the indicator mechanism 200 is configured to display indicia related to the currently-selected size of the door closer 100.

The closer body 110 extends along a longitudinal axis 111 between a first end 112 and an opposite second end 114. The first end 112 includes a first end cap 113, and the second end 114 includes a second end cap 115. As described herein, the indicator mechanism 200 is mounted to the body 110 adjacent the second end cap 115. In certain forms, the second end cap 115 may be a separate piece that is screwed into the second end 114, while in other embodiments the second end cap 115 may be integrally formed with the body 110.

The rack and pinion assembly 120 includes a piston 122 having a rack 123 defined thereon, and a pinion 124 engaged with the rack 123 such that linear movement of the piston 122 is correlated with rotation of the pinion 124. A door control arm is connected to the pinion 124 such that opening of the door causes rotation of the pinion 124 in a door-opening direction, thereby causing linear movement of the piston 122 in a corresponding opening direction (to the right in FIG. 2). Conversely, closing of the door is correlated with rotation of the pinion 124 in a door-closing direction, thereby causing linear movement of the piston 122 in a corresponding closing direction (to the left in FIG. 2).

The spring assembly 130 includes one or more springs 132, each of which has a first end engaged with the piston 122 and a second end engaged with an anchor plate 142 of the force adjustment mechanism 140 such that the springs 132 are captured between the piston 122 and the anchor plate 142. While two springs 132 are illustrated, it is also contemplated that the spring assembly 130 may include more or fewer springs 132. Movement of the piston 122 in the opening direction compresses the springs 132, thereby storing mechanical energy in the springs 132. As a result, the springs 132 exert a closing force on the piston 122, thereby urging the pinion 124 in the closing direction, which is opposite the opening direction. When the door becomes free to move toward its closed position, the springs 132 release the stored mechanical energy by expanding, thereby driving the piston 122 in the closing direction. As a result, the rack 123 drives the pinion 124 to rotate in a door-closing direction opposite the door-opening direction, thereby causing the door control arm to return the door toward its closed position.

The force adjustment mechanism 140 includes the anchor plate 142, and further includes an adjustment screw 144 that is rotatably mounted to the second end cap 115 such that a head 145 of the adjustment screw 144 is accessible from outside the body 110. The adjustment screw 144 is engaged with the anchor plate 142 such that rotation of the screw 144 in opposite directions linearly drives the anchor plate 142 along the longitudinal axis 111 of the body 110, thereby adjusting the amount by which the springs 132 are preloaded. As will be appreciated, the closing force exerted by the spring assembly 130 depends in part upon the amount of preloading applied to the springs 132, which in turn depends upon the position of the anchor plate 142 within the body 110. Thus, the closing force provided by the closer 100 can be adjusted by rotating the adjustment screw 144 to drive the anchor plate 142 back and forth within the body 110. As described herein, the indicator mechanism 200 is configured to provide a visual indication relating to the amount by which the springs 132 are preloaded.

Figure 3:
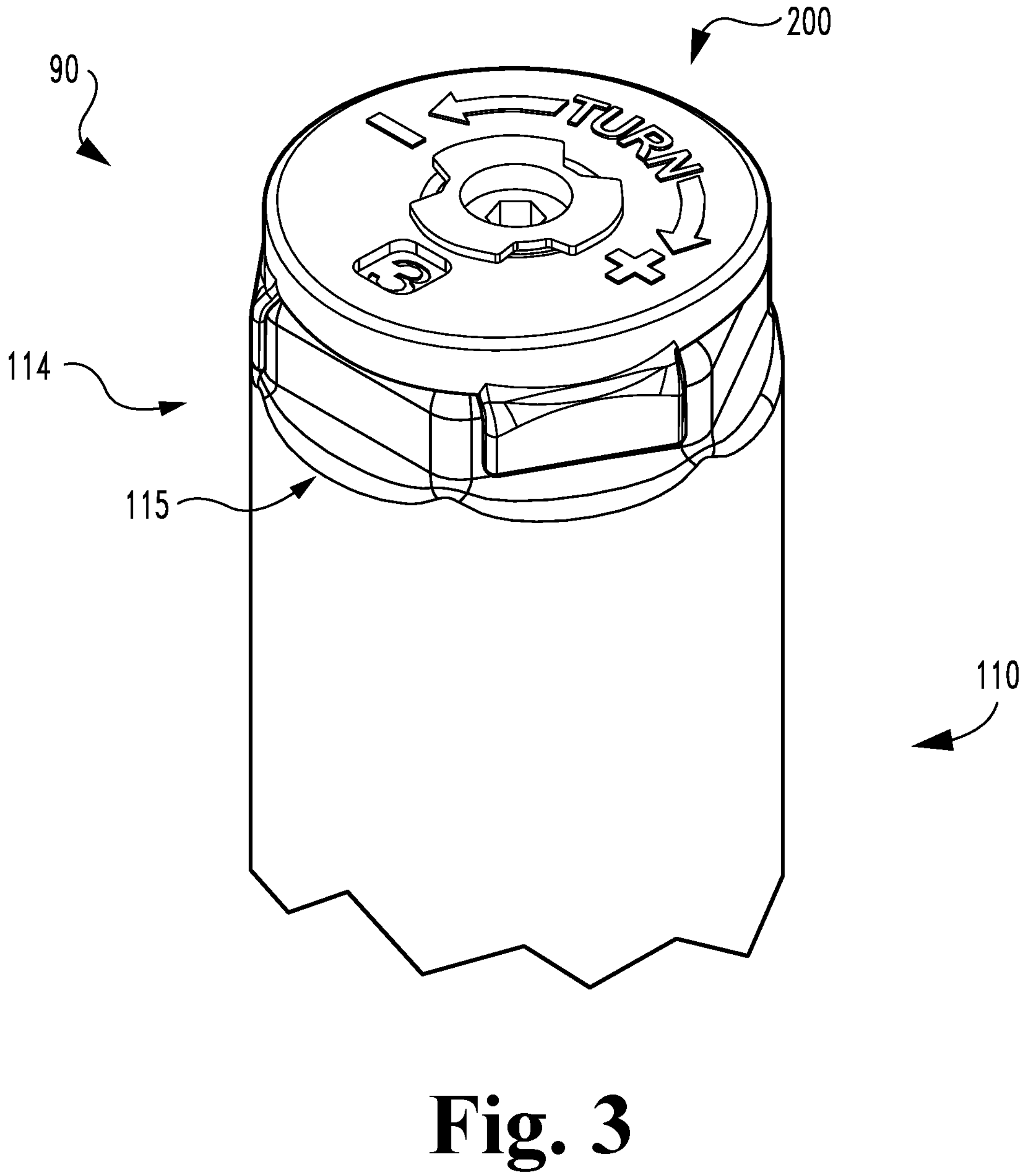
FIG. 3 is a perspective view of a portion of the door closer assembly.
Figure 4:
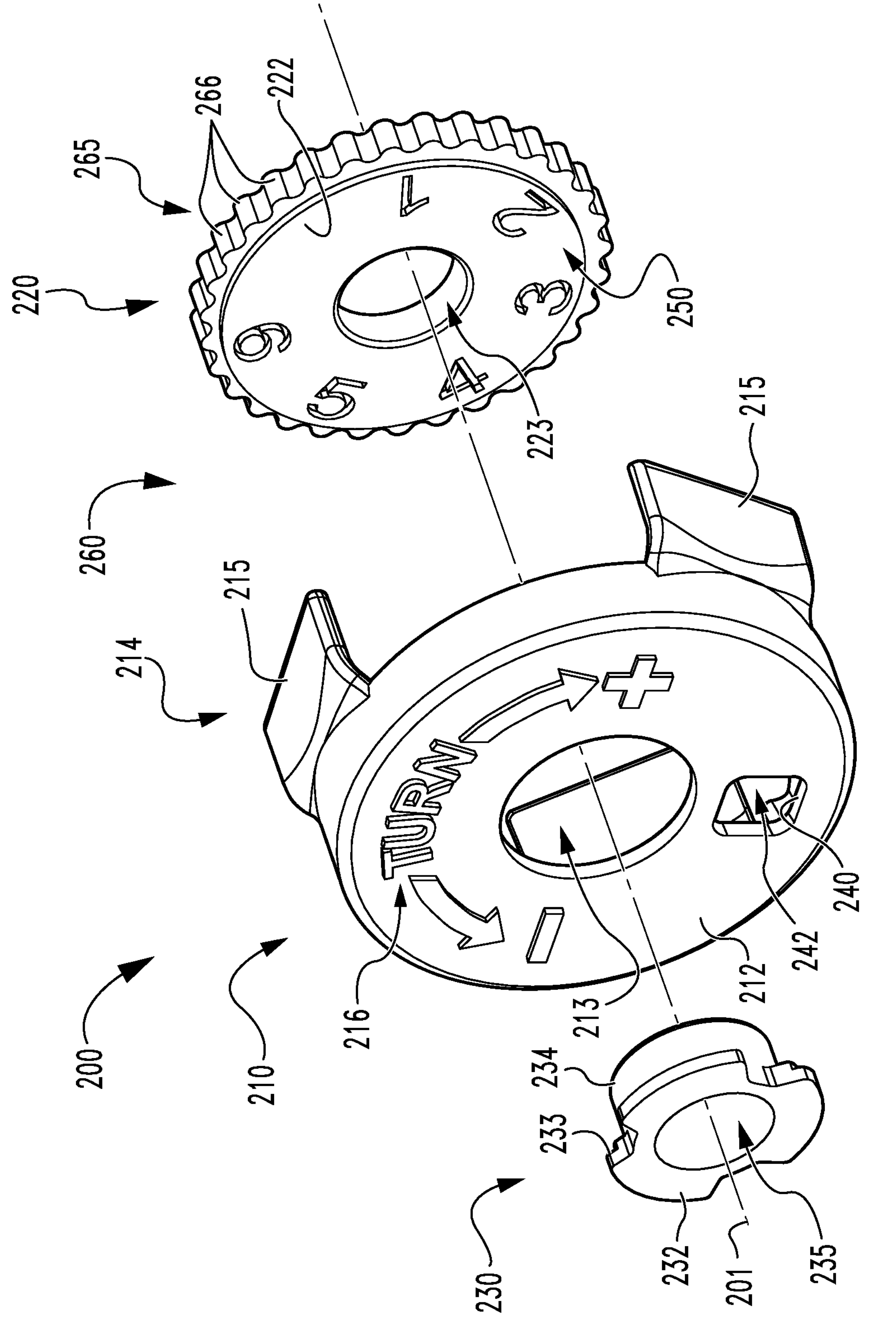
FIG. 4 is an exploded assembly view of the indicator mechanism.

With additional reference to FIGS. 3 and 4, the indicator mechanism 200 is configured for mounting to the closer body 110, and generally includes a base 210 configured for mounting to the closer body 110, a cycloidal gear 220 mounted for movement relative to the base 210, and a driver 230 rotatably supported by the base 210 and configured for engagement with the adjustment screw 144. The indicator mechanism 200 further includes an indicator 240, at least one indicium 250, and a cycloidal drive 260 configured to selectively align the indicator 240 and the at least one indicium 250 to thereby indicate the current size of the door closer 100.

Figure 5:
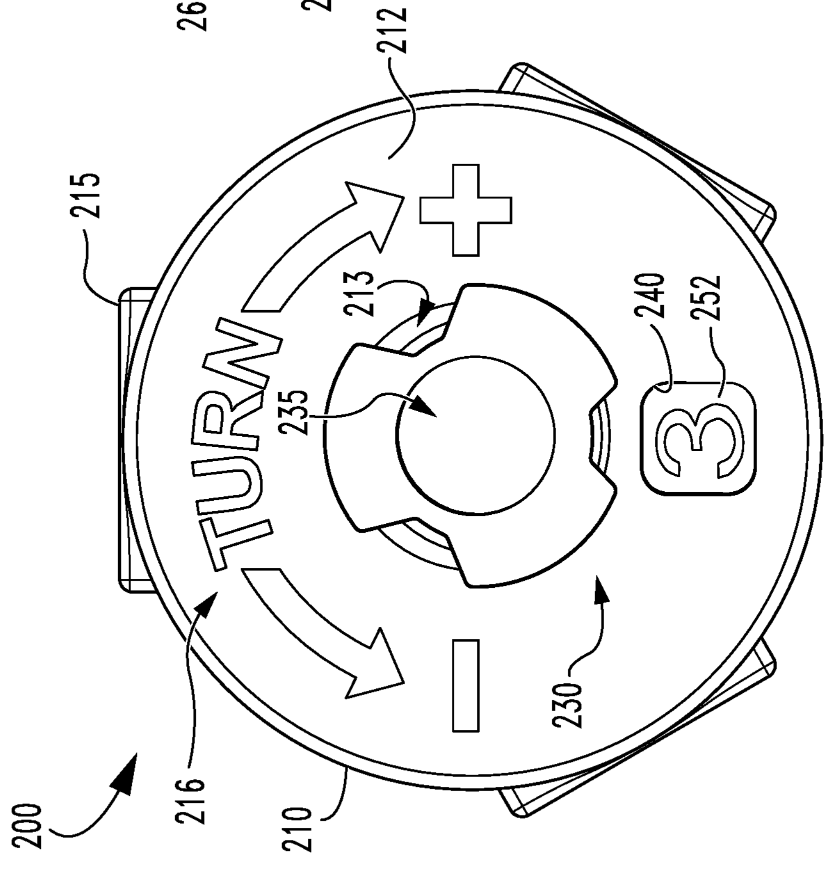
FIG. 5 is a front-side view of the indicator mechanism.

With additional reference to FIG. 5, the base 210 generally includes a plate portion 212 and an attachment mechanism 214 configured to secure the base 210 to the closer body 110. The plate portion 212 defines an aperture 213 that is centered on a rotational axis 201 and rotatably supports the driver 230. When the base 210 is mounted to the closer body 110, the aperture 213 is aligned with the adjustment screw 144 such that the rotational axis 201 is generally coincident with the rotational axis of the adjustment screw 144. The illustrated attachment mechanism 214 generally includes a plurality of legs 215 configured to engage the end cap 115 to rotationally couple the base 210 with the closer body 110. In the illustrated form, the end cap 115 is substantially hexagonal, and the attachment mechanism 214 includes three legs 215 configured to engage alternating sides of the end cap 115. It is also contemplated that the attachment mechanism 214 may include more or fewer legs 215, or may include additional or alternative coupling features for mounting the base 210 to the closer body 110. As described herein, the base portion 210 defines a fixed cycloidal drive component 261 of the cycloidal drive 260.

In the illustrated form, the front side of the base 210 further includes adjustment indicia 216 correlating at least one rotational direction with a corresponding adjustment of the closer size. In certain forms, the adjustment indicia 216 includes a plus sign adjacent a clockwise arrow to thereby indicate that clockwise rotation of the adjustment screw 144 will increase the size of the door closer 100. Additionally or alternative, the adjustment indicia 216 may include a minus sign adjacent a counter-clockwise arrow to thereby indicate that counter-clockwise rotation of the adjustment screw 144 will decrease the size of the door closer 100. In the illustrated embodiment, the adjustment indicia 216 further includes the word "TURN" to provide further indication that turning the adjustment screw 144 will adjust the size of the door closer 100. It is also contemplated that other characters, words, or symbols may be utilized. For example, the adjustment indicia 216 may include the words "SPRING POWER" to thereby provide further indication regarding the meaning of the displayed indicium.

Figure 6:
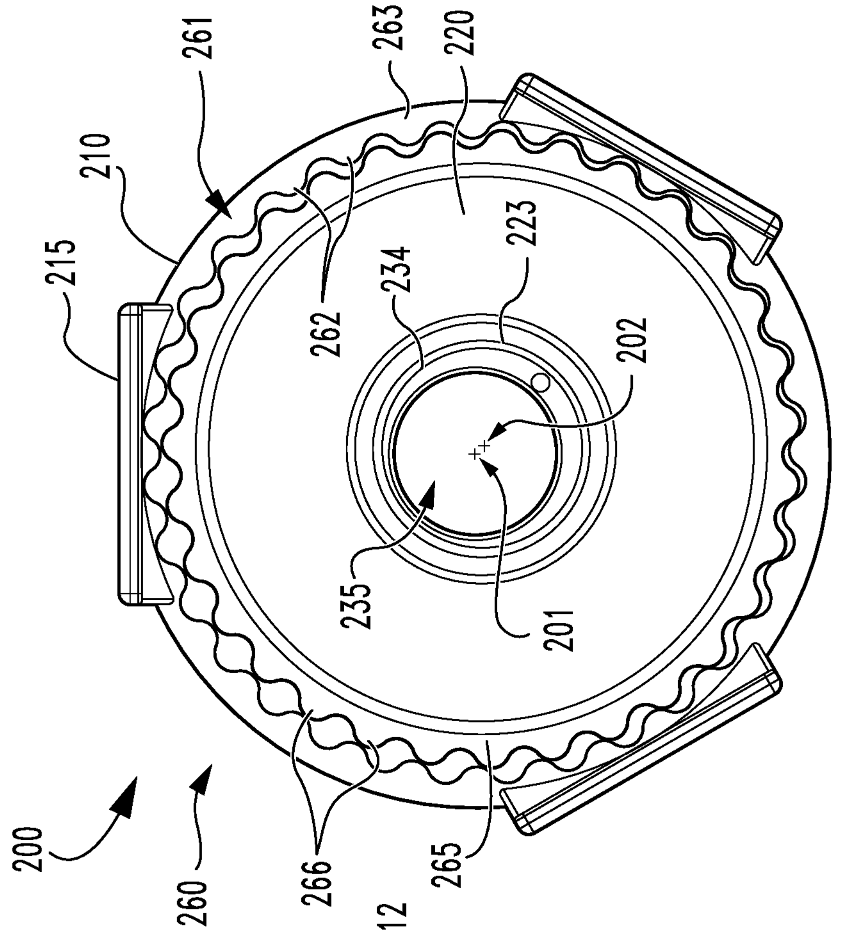
FIG. 6 is rear-side view of the indicator mechanism.
Figure 7:
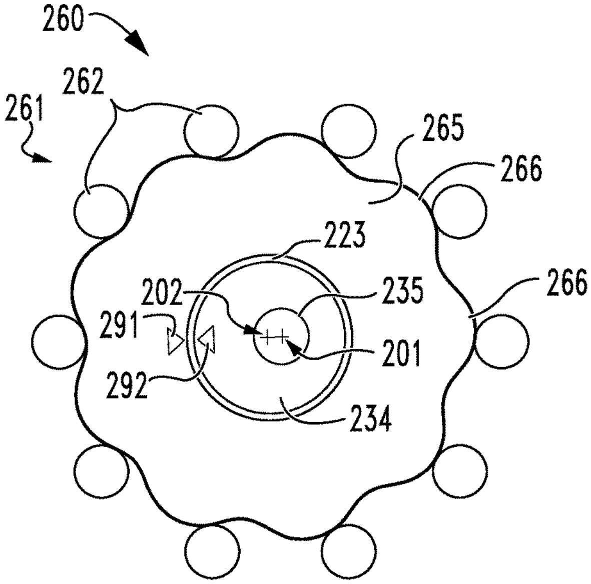
FIGS. 7-10 are schematic illustrations of a cycloidal drive during operation.
Figure 8:
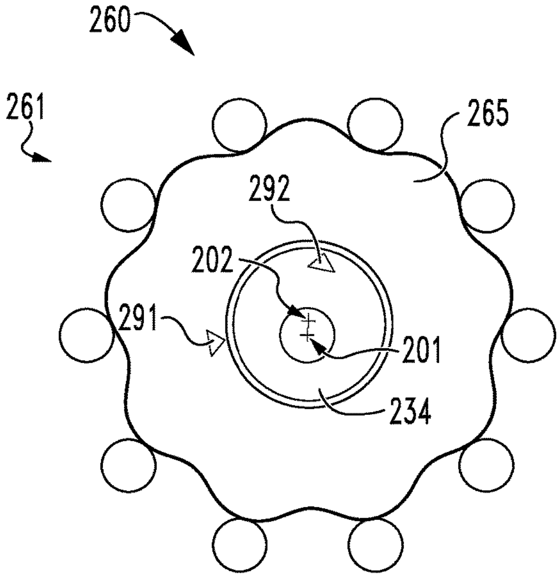
Figure 9:
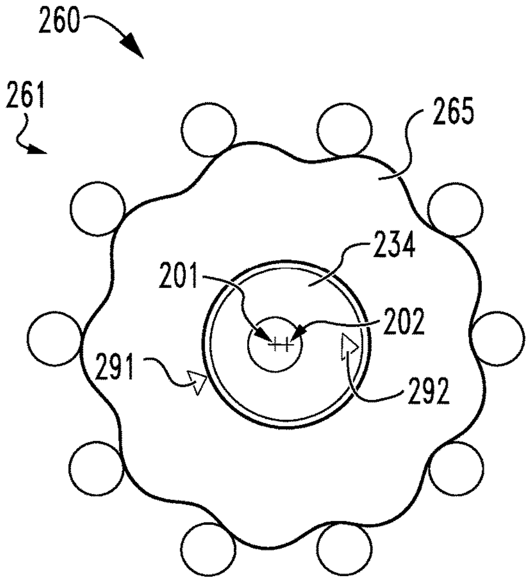
Figure 10:
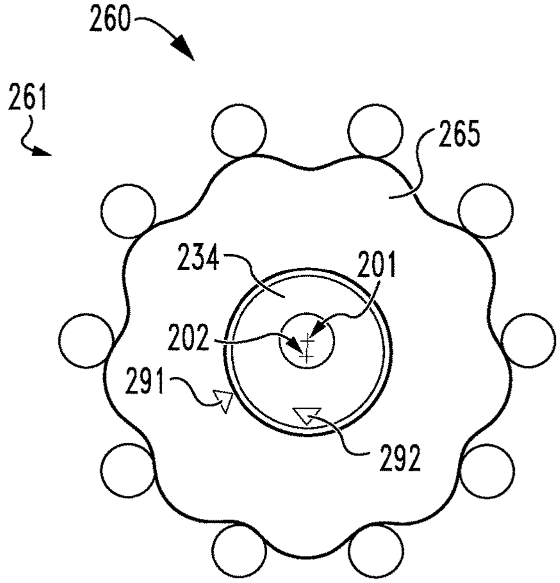

With additional reference to FIG. 6, the cycloidal gear 220 generally includes a body portion 222 that defines an aperture 223 into which the driver 230 extends. The aperture 223 is centered about a secondary axis 202 that is offset from the rotational axis 201. As described herein, the cycloidal gear 220 defines a movable cycloidal drive component 265 of the cycloidal drive 260.

The driver 230 is rotatably supported by the base 210, and includes a plate portion 232, an eccentric shaft 234 extending from the plate portion 232, and an aperture 235 sized and shaped to engage the head 145 of the adjustment screw 144. The plate portion 232 includes one or more arcuate shoulders 233 that engage the edge of the base aperture 213 such that the base 210 rotatably supports the driver 230 for rotation about the rotational axis 201. The eccentric shaft 234 extends into the cycloidal gear aperture 223, and is likewise centered on the secondary axis 202. Those skilled in the art will therefore appreciate that rotation of the driver 230 about the rotational axis 201 will cause the secondary axis 202 to orbit about the rotational axis 201. As noted above, the aperture 235 is sized and shaped to engage the head 145 of the adjustment screw 144. In the illustrated form, the aperture 235 is generally circular and is configured to receive the screw head 145 in a press-fit fashion. It is also contemplated that the aperture 235 may have another geometry and/or that the driver 230 may engage the screw head 145 in another manner. As one example, the driver 230 may include a post that extends into the recess of the screw head 145 and a corresponding recess or protrusion that facilitates manual or tool-assisted rotation of the adjustment screw 144 via the driver 230. As another example, the driver 230 may be secured to the adjustment screw 144 via an adhesive.

The indicator 240 is selectively alignable with each of the indicia 250 such that an aligned one of the indicia 250 indicates the current size of the door closer 100. In the illustrated form, the indicator 240 is provided in the form of a window 242 through which the aligned indicium 252 of the at least one indicium 250 is visible. It is also contemplated that the indicator 240 may be provided in another form. For example, in addition or as an alternative to the window 242, the indicator 240 may include a line and/or an arrow that points to the aligned indicium 252.

The at least one indicium 250 relates to one or more potential operating characteristics (e.g., sizes) of the door closer 100 such that an aligned indicium 252 that is aligned with the indicator 240 provides a visual indication of the operating characteristic (e.g., size). In the illustrated embodiment, the at least one indicium 250 includes a plurality of numerical indicia ranging from "1" (indicating the smallest potential size of the closer 100) to "6" (indicating the largest potential size of the closer 100). It is also contemplated that the at least one indicium 250 may take another form, such as one including a wedge, bars, colors, letters, icons, and/or other symbols.

In the illustrated form, the indicator 240 is provided on the base 210, which corresponds to the fixed cycloidal drive component 261 as noted above. As such, the at least one indicium 250 is provided on the cycloidal gear 220, which corresponds to the movable cycloidal drive component 265 as noted above. In other embodiments, the indicator 240 may be provided on the cycloidal gear 220 or movable cycloidal drive component 265, and the at least one indicium 250 may be provided on the base 210 or fixed cycloidal drive component 261.

The cycloidal drive 260 generally includes a fixed cycloidal drive component 261 defined by the base 210, a movable cycloidal drive component 265 defined by the cycloidal gear 220, and the eccentric shaft 234 of the driver 230. The fixed cycloidal drive component 261 comprises a first plurality of lobes 262, and the movable cycloidal drive component 265 comprises a second plurality of lobes 266 operable to engage the first plurality of lobes 262. In the illustrated form, the fixed cycloidal drive component 261 defines a ring gear 263 including the first plurality of lobes 262. It is also contemplated that the first plurality of lobes 262 may be discrete lobes, for example as illustrated in FIGS. 7-10. Additionally, while the illustrated lobes 262, 266 are generally curvilinear, it is also contemplated that the first lobes 262 and/or the second lobes 266 may include rectilinear portions, such as more-traditional gear teeth. Moreover, although the illustrated cycloidal drive 260 includes the outer lobes 262 on the fixed component 261 and the inner lobes 266 on the movable component 265, it is also contemplated that the outer lobes may be formed on the movable component 265 and the inner lobes may be formed on the fixed component 261.

With additional reference to FIGS. 7-10, illustrated therein is a schematic representation of the cycloidal drive 260 during rotation of the driver 230 in a clockwise direction. Also illustrated in FIGS. 7-10 are indicator arrows 291, 292 that facilitate the illustration of the operation of the cycloidal drive 260. In an initial orientation (FIG. 7), a first indicator arrow 291 provided to the movable component 265 is aligned with a second arrow 292 provided to the eccentric shaft 234. As the eccentric shaft 234 rotates in a clockwise direction, the eccentricity of the shaft 234 urges the lobes 262, 266 into engagement with one another. This engagement results in the fixed lobes 262 exerting on the movable lobes 266 forces that urge the movable component 265 to rotate in the second direction (counter-clockwise in FIGS. 7-10) at a slower rate than the shaft 234 rotates in the first direction. As a result, a full rotation of the driver 230 in one direction (e.g., clockwise), results in a relatively small (e.g., 20° or less) rotation of the movable component 265 in the second direction (e.g., counter-clockwise).

Those skilled in the art will readily appreciate that the amount by which the movable component 265 rotates in response to one full rotation of the driver 230 depends upon various factors, including the number, size, and spacing of the lobes 262, 266 and the offset distance defined between the rotational axis 201 and the secondary axis 202. Armed with the present disclosure, those skilled in the art will readily be able to select the various characteristics to produce a desired movement ratio for the movable component 265 relative to the driver 230 to selectively align the appropriate indicium 250 with the indicator 240.

By way of illustration, if movement between Size 2 and Size 3 requires five complete rotations of the adjustment screw 144, one may select a movement ratio of 72:1 such that the movable component 265 rotates by 5° for every complete rotation of the driver 230, and may angularly offset the "2" indicium from the "3" indicium by 25°. In such forms, an adjustment operation may begin with the closer 100 at Size 2, with the "2" indicium being the aligned indicium 252 aligned with the indicator 240. The user may then rotate the adjustment screw 144 (and thus the driver 230) clockwise five times, with the movable component 265 rotating 5° counter-clockwise for each rotation of the adjustment screw 144. When the "3" indicium becomes the aligned indicium 252 aligned with the indicator 240, the indicator mechanism 200 indicates to the user that the closer 100 is now Size 3.

The concepts set forth herein may provide one or more advantages over existing indicator mechanisms. For example, certain existing indicator mechanisms involve a cap, an indicator plate defining a ring gear, a partially-toothed gear mounted to the adjustment screw, and an intermediate gear positioned between the ring gear and the partially-toothed gear. Certain embodiments of the present application obviate the need for an intermediate gear, which may result in a simpler construction that is more easily manufactured. Simplified manufacturing may in turn reduce production costs while maintaining the gear reduction ratio that may be warranted in cases where the adjustment screw must be rotated by a greater amount than the indicator plate.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An indicator assembly for a door closer having an adjustment screw, the indicator assembly comprising:
an indicator;
at least one indicium; and
a cycloidal drive configured to selectively align the indicator and the at least one indicium in response to rotation of the adjustment screw to thereby indicate an operating characteristic of the door closer.

2. The indicator assembly of claim 1, wherein the cycloidal drive comprises:
a fixed cycloidal drive component comprising one of the indicator or the at least one indicium; and
a movable cycloidal drive component movably engaged with the fixed cycloidal drive component, wherein the movable cycloidal drive component comprises the other of the indicator or the at least one indicium.

3. The indicator assembly of claim 2, wherein the cycloidal drive further comprises a driver adapted for rotatable engagement with the adjustment screw of the door closer.

4. The indicator assembly of claim 3, wherein the fixed cycloidal drive is adapted for mounting to a body of the door closer.

5. The indicator assembly of claim 2, wherein the fixed cycloidal drive component is adapted for mounting to a body of the door closer.

6. The indicator assembly of claim 2, wherein the fixed cycloidal drive component comprises a first plurality of lobes; and
wherein the movable cycloidal drive component comprises a second plurality of lobes.

7. The indicator assembly of claim 6, wherein the fixed cycloidal drive component comprises a ring gear including the first plurality of lobes.

8. The indicator assembly of claim 2, wherein the fixed cycloidal drive component comprises the indicator; and
wherein the movable cycloidal drive component comprises the at least one indicium.

9. The indicator assembly of claim 1, further comprising adjustment indicia correlating a rotational direction with a corresponding adjustment of the operating characteristic.

10. The indicator assembly of claim 1, wherein the indicator is provided on a first component of the cycloidal drive;
wherein the at least one indicium is provided on a second component of the cycloidal drive;
wherein one of the first component or the second component is adapted for coupling with the door closer; and
wherein the other of the first component or the second component is movable relative to the door closer.

11. The indicator assembly of claim 1, wherein the indicator comprises a window through which an indicium of the at least one indicium is visible.

12. The indicator assembly of claim 1, wherein the at least one indicium comprises a plurality of indicia.

13. The indicator assembly of claim 1, wherein the cycloidal drive comprises:
a base adapted for mounting to a body of the door closer, the base comprising a plurality of lobes and one of the indicator or the at least one indicium;
a cycloidal gear mounted for movement relative to the base, the cycloidal gear comprising the other of the indicator or the at least one indicium;
a driver rotatably supported by the base and adapted for engagement with the adjustment screw, the driver comprising an eccentric shaft engaged with the cycloidal gear; and
a cycloidal drive configured to selectively align the indicator and the at least one indicium to thereby indicate the operating characteristic of the door closer, the cycloidal drive comprising the plurality of lobes, the cycloidal gear, and the eccentric shaft.

14. The indicator assembly of claim 13, wherein the driver is rotatably mounted to the base for rotation about a rotational axis; and
wherein the eccentric shaft is circular about a secondary axis offset from the rotational axis.

15. A door closer, comprising:
an adjustment screw configured to adjust an operating characteristic of the door closer; and
a cycloidal drive configured to selectively align an indicator with at least one indicium in response to rotation of the adjustment screw to thereby indicate the operating characteristic of the door closer.

16. The door closer of claim 15, wherein the cycloidal drive comprises:
a fixed cycloidal drive component comprising one of the indicator or the at least one indicium; and
a movable cycloidal drive component movably engaged with the fixed cycloidal drive component, wherein the movable cycloidal drive component comprises the other of the indicator or the at least one indicium.

17. The door closer of claim 16, wherein the cycloidal drive further comprises a driver rotatably engaged with the adjustment screw.

18. The door closer of claim 17, wherein the fixed cycloidal drive is mounted to a body of the door closer.

19. The door closer of claim 16, wherein the fixed cycloidal drive component comprises a first plurality of lobes; and
wherein the movable cycloidal drive component comprises a second plurality of lobes that engage the first plurality of lobes.

20. The door closer of claim 15, wherein the indicator is provided on a first component of the cycloidal drive;
wherein the at least one indicium is provided on a second component of the cycloidal drive;
wherein one of the first component or the second component is adapted for coupling with the door closer; and
wherein the other of the first component or the second component is movable relative to the door closer.

* * * * *